(12) United States Patent
Heimann, Jr. et al.

(10) Patent No.: US 6,642,709 B2
(45) Date of Patent: Nov. 4, 2003

(54) SIGNAL WHEEL FOR GENERATING ROTATIONAL POSITION SIGNAL

(75) Inventors: Rudy J. Heimann, Jr., Brunswick, OH (US); Keith Fishburn, Berea, OH (US); Michael G. Nejman, Avon, OH (US)

(73) Assignee: A.J. Rose Manufacturing Co., Avon, OH (US)

( * ) Notice: Subject to any disclaimer, the term of this patent is extended or adjusted under 35 U.S.C. 154(b) by 7 days.

(21) Appl. No.: 10/034,272

(22) Filed: Dec. 27, 2001

(65) Prior Publication Data

US 2003/0122539 A1 Jul. 3, 2003

Related U.S. Application Data

(63) Continuation-in-part of application No. 09/959,292, filed on Oct. 17, 2001.

(51) Int. Cl.[7] .................................................. G01B 7/30
(52) U.S. Cl. .................. 324/173; 324/207.22; 384/448
(58) Field of Search ................................. 324/166, 173, 324/174, 207.2, 207.21, 207.24, 207.25, 207.22; 384/448; 73/493, 494

(56) References Cited

U.S. PATENT DOCUMENTS

| | | | |
|---|---|---|---|
| 3,936,684 A | | 2/1976 | Anselmino et al. ......... 310/168 |
| 3,939,373 A | * | 2/1976 | Roberts ...................... 310/168 |
| 4,001,687 A | * | 1/1977 | Sorkin et al. ............... 324/173 |
| 4,046,181 A | | 9/1977 | Barnsdale ................ 151/41.73 |
| RE29,509 E | * | 1/1978 | Pauwels et al. ............. 310/168 |
| 4,628,200 A | | 12/1986 | Tinios .................. 250/231 SE |
| 4,700,133 A | | 10/1987 | Day ............................ 324/208 |
| 4,719,419 A | | 1/1988 | Dawley ...................... 324/208 |
| 4,795,278 A | | 1/1989 | Hayashi ...................... 384/448 |
| 4,797,611 A | | 1/1989 | Schreiber .................... 324/208 |

(List continued on next page.)

Primary Examiner—Jay Patidar
(74) Attorney, Agent, or Firm—Pearne & Gordon LLP (57) ABSTRACT

A tone wheel for generating electrical pulses at a rate proportional to the rotational speed of a road wheel. The tone wheel is stamped from sheet steel stock and is characterized by elongated, axially extending teeth supported in cantilever fashion from one end on roots extending radially from a center portion of the tone wheel. The teeth are spaced from each other and for a major portion of their length are free of adjacent structure so that they produce a sharp pulse when scanned by a sensor and are self-cleaning to reduce the risk of accumulating dirt and debris which can otherwise result in destruction of the sensor. In other embodiments of the invention, a signal wheel is a composite of a ferromagnetic steel and a non-magnetic material such as plastic. The non-magnetic material serves to block entry of debris or oil into the gaps between the teeth thereby reducing the risk of damage from solid debris or reducing churning and aeration of oil in which the wheel may run.

17 Claims, 8 Drawing Sheets

U.S. PATENT DOCUMENTS

| | | | |
|---|---|---|---|
| 4,847,527 A | 7/1989 | Dohogne | 310/218 |
| 4,940,937 A | 7/1990 | Hattori et al. | 324/207.22 |
| 4,947,116 A * | 8/1990 | Welcome et al. | 324/173 |
| 4,953,670 A | 9/1990 | Chemelewski | 188/181 A |
| 5,053,656 A | 10/1991 | Hodge | 310/42 |
| 5,166,611 A | 11/1992 | Kujawa, Jr. et al. | 324/166 |
| 5,229,715 A | 7/1993 | Niino et al. | 324/207.15 |
| 5,391,031 A | 2/1995 | Medal | 411/82 |
| 5,407,213 A | 4/1995 | Ouchi et al. | 277/2 |
| 5,431,413 A | 7/1995 | Hajzler | 277/2 |
| 5,434,504 A * | 7/1995 | Hollis et al. | 324/207.17 |
| 5,438,260 A | 8/1995 | Rigaux et al. | 324/166 |
| 5,442,221 A | 8/1995 | Mosser et al. | 257/425 |
| 5,551,291 A | 9/1996 | Morita | 73/494 |
| 5,591,466 A | 1/1997 | Bressler et al. | 425/577 |
| 5,648,614 A | 7/1997 | Martsfeld et al. | 73/706 |
| 5,670,874 A | 9/1997 | Miyazaki et al. | 324/174 |
| 5,713,577 A | 2/1998 | Lannert et al. | 277/2 |
| 5,739,615 A | 4/1998 | McClelland | 310/186 |
| 5,788,904 A | 8/1998 | Lannert et al. | 264/236 |
| 5,793,198 A | 8/1998 | Ouchi et al. | 324/174 |
| 5,828,152 A | 10/1998 | Takeda et al. | 310/156 |
| 5,850,141 A | 12/1998 | Adler | 324/174 |
| 6,045,133 A | 4/2000 | Lannert et al. | 277/321 |
| 6,193,456 B1 | 2/2001 | Stumpf et al. | 411/180 |
| 6,200,513 B1 | 3/2001 | Emmett | 264/274 |
| 6,218,827 B1 | 4/2001 | Ohmi et al. | 324/174 |
| 6,232,739 B1 | 5/2001 | Krefta et al. | 318/652 |
| 6,329,814 B1 | 12/2001 | Ichiman et al. | 324/207.22 |

* cited by examiner

SIGNAL WHEEL FOR GENERATING ROTATIONAL POSITION SIGNAL

This application is a continuation-in-part of application Ser. No. 09/959,292, filed Oct. 17, 2001.

SUMMARY OF THE INVENTION

The invention relates to improvements in tone wheels used to generate signals that correspond to the rate of rotation of a wheel or wheels of a land vehicle and pulse wheels used to generate signals that correspond to the angular position and speed of a combustion engine crankshaft.

BACKGROUND OF THE INVENTION

It is known to provide a ferromagnetic toothed wheel or tone wheel to generate with a sensor an electrical signal that effectively instantaneously indicates rotational speed of a wheel in an automobile or other land vehicle. This information can be used to determine, among other things, that a particular wheel or wheels is/are skidding and to modulate the braking forces on the wheel or wheels to reduce or eliminate the skidding condition. A tone wheel can also be used in wheeled land vehicles to generate signals for a traction control system or in a transmission. Pulse wheels, in addition to signaling speed can also indicate angular position for example, in engine ignition control.

The accuracy of the signal depends, in part, on the accuracy of the formation of the teeth. It is important that the teeth are not only uniformly spaced about the periphery of a wheel, but also that the cross-sectional shape of each tooth is the same as all others and that the tooth profile is characterized by relatively sharp edges.

It is known to produce powder metal tone wheels. These prior art products have demonstrated that they are prone to accumulate oil, grease and debris between adjacent teeth. This accumulation, which can include metallic dust, diminishes the quality of the signal that the associated sensor can produce ultimately to a point where the anti-skid system fails to work properly. Foreign objects can become lodged between adjacent teeth on the tone wheel, which look like annular gears, and when such objects are carried past a sensor they may strike and break it or may abrade it to the point of destruction. An additional problem with powdered metal tone wheels is that they are susceptible to cracking in service in part due to residual stresses that occur when they are press-fit onto a shaft or other part. These cracked parts may produce error signals rendering the anti-skid system inoperative.

SUMMARY OF THE INVENTION

The invention, according to one aspect, provides an improved tone wheel fabricated from sheet steel in a configuration that produces an improved signal and is stronger, lighter and more cost effective than prior art products. Still further, the tone wheel of the invention reduces the risk of damage to the sensor associated with it.

As disclosed, the tone wheel has a multitude of evenly spaced axially oriented teeth at its periphery or rim. The teeth are supported in cantilever fashion from a wheel center portion so that the center portion has negligible influence on the signal being produced by the sensor. The tone wheel thus exhibits clear transitions between the presence and absence of a tooth in its scanned area.

More particularly, the tone wheel, formed from ferromagnetic malleable steel, assures that it will provide a long service life without risk of fracture through brittleness or fatigue. The inherent strength of the steel allows the wheel to be fabricated with relatively light gauge stock so as to reduce weight while retaining strength. The malleable steel is economical in cost and can be fabricated by relatively inexpensive stamping techniques.

In the illustrated forms of the tone wheel, the teeth are free of interconnected webs in the area scanned by the sensor. Consequently, since there is no structure between the teeth in the relevant areas, foreign material cannot readily buildup in the gaps between the teeth. Thus, there is a greatly reduced risk of damage to the sensor by abrasion or impact with foreign material which could otherwise accumulate or become lodged in the areas between the teeth. The open network of the teeth, as well as the improved signal generating character of the teeth, is augmented by an arrangement where the teeth are supported on roots which are formed on the outer periphery of the center portion of the wheel. The roots have intervening areas that are angularly aligned with the slots between the rim teeth. The resulting wheel configuration is devoid of any ferromagnetic material angularly between the teeth even at their juncture with the roots so that the open lattice or network of the teeth is maintained along their full length.

Another aspect of the invention involves both tone wheels and pulse wheels both hereinafter sometimes referred to as signal wheels that are made as composites of ferromagnetic material and non-magnetic material. This composite construction can afford still further reductions in weight, improvements in cost effectiveness and reduction in the risk of damage to the signal wheel and/or a sensor monitoring its rotation.

In the various disclosed embodiments of the composite signal wheel, the ferromagnetic material is formed into so-called "teeth" evenly spaced from one another about the periphery of the wheel. The gaps between the spaced teeth are blocked by the non-magnetic or non-metallic material to reduce the risk that debris can be caught or collect between the teeth. As previously discussed, if debris would be caught or collected on the wheel, it can forcibly impact or eventually abrade and thereby destroy the sensor. Also, as previously mentioned in the case of an impact, the signal wheel itself can be damaged and rendered useless. In some embodiments, the non-metallic material is molded or otherwise formed so that it occupies the space between the teeth to produce a relatively smooth peripheral surface on the wheel with essentially no significant pockets between the teeth to catch debris. In other embodiments, the non-metallic material advantageously blocks the gaps between the teeth.

As disclosed, the non-metallic material such as a suitable plastic can be over-molded onto the ferromagnetic material such that it substantially completely encapsulates the teeth. In this manner, in addition to protecting the wheel from picking up debris, the plastic also protects the wheel against corrosion.

In pulse wheel versions of the signal wheel, typically, a single tooth on the wheel is omitted so that a sensor and associated electronics can determine the angular position as well as the speed of a shaft. When used inside an internal combustion engine of a car or truck, for example, the wheel may be partially immersed in a pool of oil. The non-metallic or plastic part of the wheel, by eliminating or reducing irregularities or pockets on the wheel, especially between the teeth, reduces the risk that the teeth can operate like paddles on a paddle wheel or vanes on an impeller. This reduces churning and aeration of the oil which can have adverse effects on other engine components.

Where desired, the non-metallic material can be configured to reinforce the metal wheel component thereby allowing the metal content to be reduced to only that required to develop a satisfactory signal. A reduction in the metal content can result in a reduction in weight and improvements in cost effectiveness both in material and processing.

DESCRIPTION OF THE PREFERRED EMBODIMENTS

Figure 1:
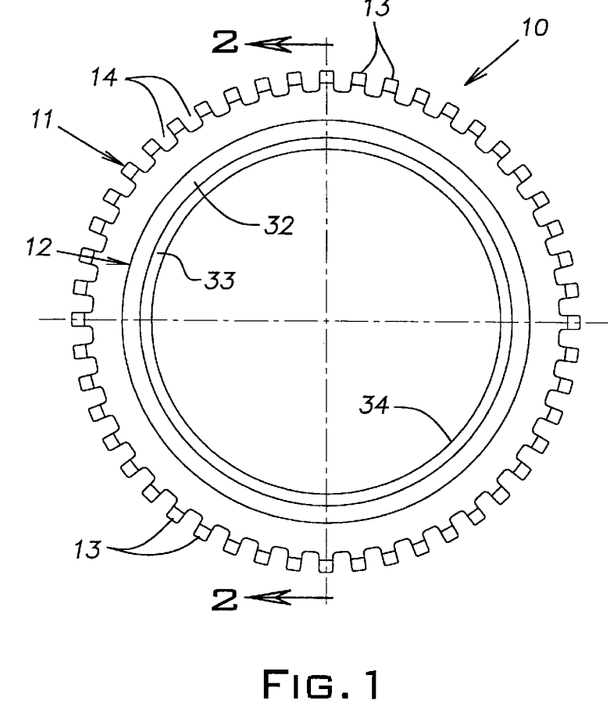
FIG. 1 is a side elevational view of a first embodiment of a tone wheel constructed in accordance with the invention.
Figure 1A:
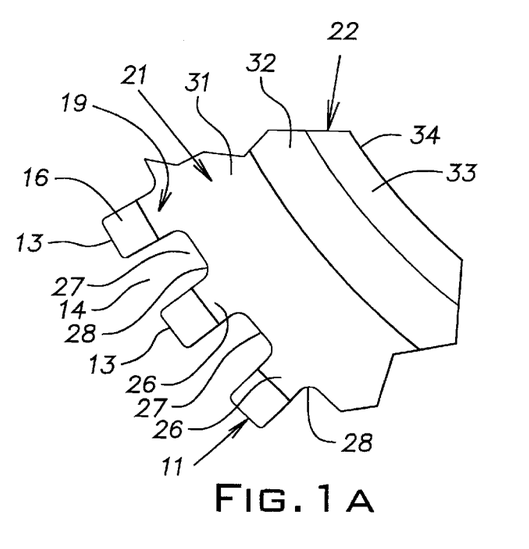
FIG. 1A is an enlarged fragmentary view of a portion of the tone wheel.
Figure 2:
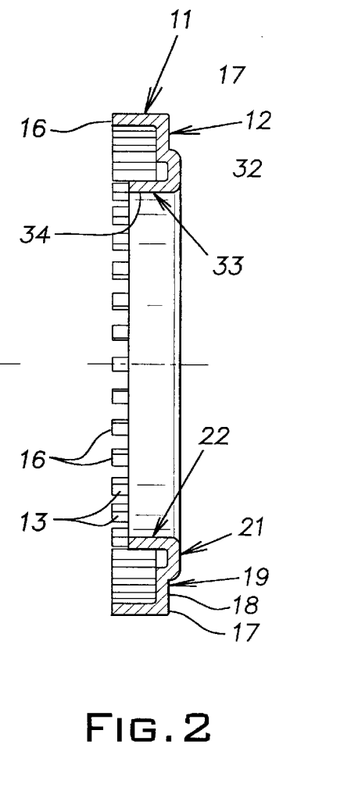
FIG. 2 is a cross-sectional view of the tone wheel taken in the plane indicated at 2—2 in FIG. 1.
Figure 3:
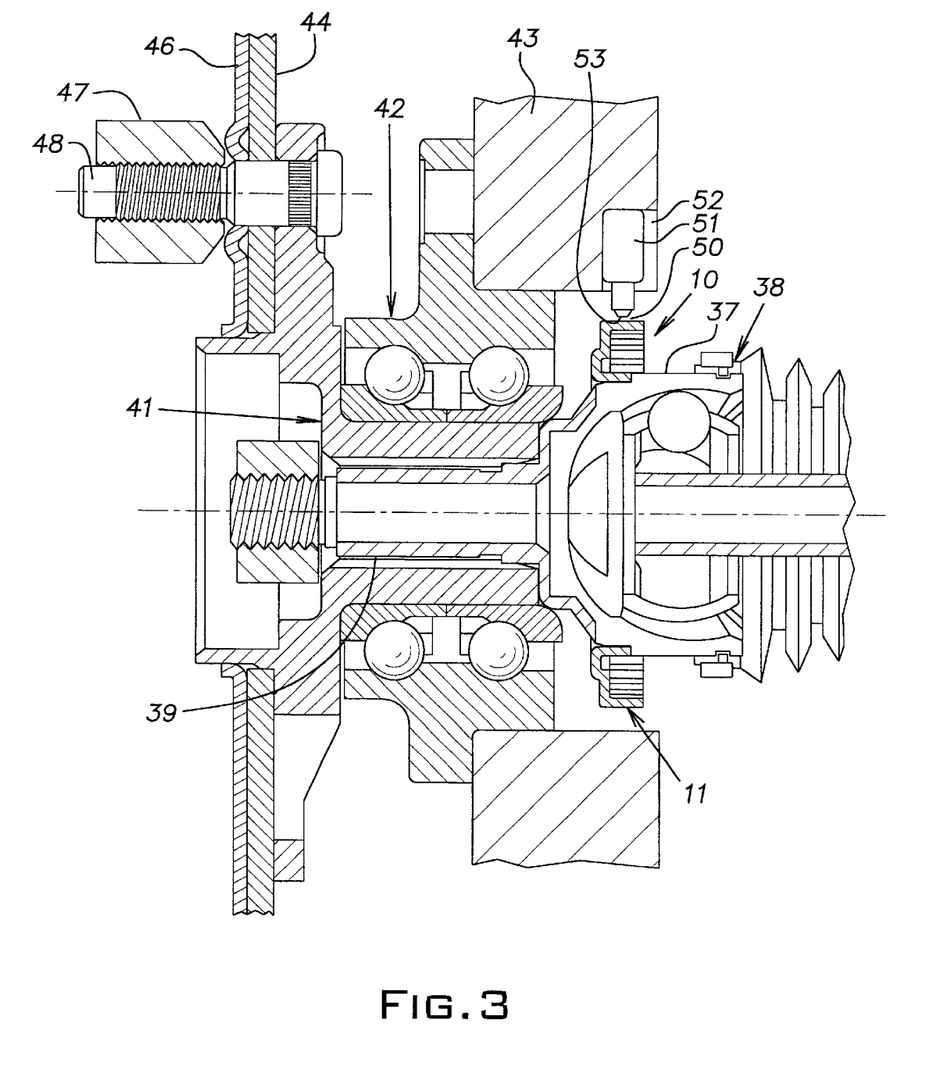
FIG. 3 is a cross-sectional view of a wheel suspension area of a land vehicle and the assembled relationship of the tone wheel of FIGS. 1–2 to this structure.

Referring now to FIGS. 1–3, there is illustrated one type of tone wheel 10 constructed in accordance with the present invention. The tone wheel 10 is formed by stamping operations performed on sheet steel stock. By way of example, but not limitation, the metal stock can be low carbon steel 2.49/2.69 mm thick. Because of its iron content, the steel stock is ferromagnetic; additionally, this stock is malleable.

The tone wheel 10 is a unitary annular body having a peripheral or rim portion 11 and a center portion 12 concentric with each other about a common axis. The peripheral portion 11 comprises a multitude, in this example 48, of axially extending essentially identical teeth 13. The teeth 13 are uniformly spaced around the periphery of the tone wheel 10 with essentially identical intervening slots 14. The width of the slots 14 in a circumferential direction is similar to the width of the teeth 13 in the circumferential direction with the width of either the teeth or the slots preferably not being more than twice that of the other. In the illustrated case, but not necessarily, the width of the slots is 3.6 mm while the width of the teeth is 2.6 mm. The cross-section of the teeth 13 in a plane perpendicular to the axis of the tone wheel 10 is rectangular and, preferably, though not necessarily, is nominally square, it being understood that the term rectangular includes the condition of being square. The axial length of the teeth 13 is preferably several times their width. In the illustrated case this length is nominally 10.5 mm measured from a free cantilevered end 16 of a tooth to an inward end 17 of the tooth at an outer face 18 of a radially outer peripheral section 19 of the wheel center portion 12.

The wheel center portion 12 has, besides the radially outer peripheral section 19, an intermediate section 21 and an inner peripheral section 22. The outer peripheral section 19, which lies in a generally flat radial plane transverse to the axis of the tone wheel 12 includes a multitude of circumferentially spaced roots 26 that each support a respective one of the teeth 13. Each root 26 has a width generally equal to the width of a tooth 13 so that, in effect, the root is a radial extension of a tooth. The roots 26 are separated by gaps 27 that are aligned with and merge into the slots 14 between the teeth 13. The depth of each gap 27 below an inner face of a tooth 13 is less than that of the thickness of a tooth and, for example, can be about as large as ½ the tooth thickness. As seen in FIG. 1, the base of a root 26 has a small fillet area 28 at each gap 27.

Radially inward of the roots 26, the intermediate section 21 is preferably, but not necessarily, imperforate. The intermediate section 21 includes a flat part 31 in a radial plane common with the roots 26 and an annular rib or bead 32. The annular bead 32 is stamped or pressed into the intermediate section 21 to improve rigidity so that the body of the wheel 10, as a whole, remains planar or flat.

The inner peripheral section 22 of the center portion 12 has a flange 32 that extends axially from the rib or bead 32 in the same direction as the extension of the teeth 13. The axial flange 33 has a precisely formed cylindrical bore 34 preferably made by an extrusion stamping process. The flange bore 34 is relatively long compared to the thickness of the sheet stock from which the wheel 10 is made so that when assembled onto a shaft or other rotating part, it is sufficiently rigid and stable. The bore 34, in the illustrated example, is nominally 10 mm long as compared with the gauge thickness of the wheel at nominally 2.6 mm thick. The outside diameter of the wheel 10 across the outer surfaces of the teeth 13 is nominally 94.4 mm for purposes of illustration but not limitation.

FIG. 3 illustrates the tone wheel 10 in a typical assembled condition on a wheel suspension system on a land vehicle such as a passenger vehicle, sport utility vehicle, pick-up truck, or similar vehicle. The tone wheel 10 is mechanically coupled to a road wheel 46 (fragmentarily shown in FIG. 3 and understood to carry a conventional tubeless tire or equivalent) by fixing it to a rotating member that turns with the wheel. More specifically, in the illustrated case, the tone wheel 10 is fixed on the exterior of a housing 37 on an outer constant velocity joint 38 that is part of a front drive shaft that, when being driven, power rotates the road wheel 46 through its output spline 39. The spline 39 rotates a hub assembly 41 journaled for rotation in a bearing assembly 42 carried in a steering knuckle 43 forming part of the front suspension of a vehicle in a generally conventional arrangement. A brake rotor 44 and the road wheel 46 are carried on the hub assembly 41. Lug nuts 47 threaded onto studs 48 fix the wheel 46 and brake rotor 44 on the hub assembly 41.

A sensor 51 of known construction is retained in a pocket or bore 52 in the steering knuckle 43 by a suitable bolt or clamp (not shown) in a known manner. The sensor 51 is located relatively close to the periphery of the tone wheel 10. A gap 50 between a face 53 of the sensor 51 and the periphery of the tone wheel 10 formed by the outside surface of the teeth 13 can range between near contact to about 1 mm. By way of example, but not limitation, the sensor 51 "sees" or scans an area on the periphery of the tone wheel 10 that is about 2.5 mm square. The sensor 51 reacts to the presence or absence of a tooth 13 in the space near it in a known manner to produce a pulsed electrical signal. The time between pulses is proportional to the rotational speed of the tone wheel 10 and this data is used in a brake system to determine if a wheel is skidding so that braking forces can automatically be adjusted.

The tone wheel 10 is preferably press fit onto the exterior of the constant velocity joint housing 37 of the axle with a sufficiently tight fit to assure it will remain in place during normal service. If desired, the tone wheel 10 can be fixed in place by other techniques such as by the use of welding, adhesives, fasteners or other types of retainers rather than by a press fit or to supplement a press fit. As FIG. 3 illustrates, the tone wheel 10 is exposed to the atmosphere and environment of the road wheel 46. No seal or seals exist to isolate the tone wheel 10 from this environment. The disclosed tone wheel 10, with its open teeth 13, has demonstrated several advantages over conventional tone wheels such as the solid gear-like type formed of powdered metal. The tone wheel 10 of the invention is more cost effective, lighter, stronger and capable of producing a "sharper" signal than this common powdered metal type of tone wheel. The signal sharpness is at partially least attributable to the configuration of the teeth wherein they have no roots or underlying supporting material in all or most of the area to which the sensor is magnetically responsive. Where the scanned area is about 2.5 mm square and the sensor 51 is at about mid-length of the teeth 13 that are, for example, 10 mm long, the roots 26 and other parts of the center portion 12 are out of range of detection by the sensor. Thus, there is no significant fuzzy advance or retarding of the signal phenomena contributed by the approach of a tooth root zone to and from the area of sensitivity of the sensor 51.

Stated in other words, as disclosed, the length of the teeth 13 is large in comparison to the area in which the sensor is magnetically sensitive. This feature enables the roots 26 on the center portion 12 to be offset (in the axial direction of the tone wheel 10) a sufficient distance from the area in which the sensor is most sensitive so that little or no blurring or degradation of the signal produced by the cantilevered teeth 13 occurs through influence of the roots 26.

The disclosed tone wheel 10 has the additional advantage of reducing the risk of damage to the sensor 51 which has occurred with prior art tone wheel designs where dirt and debris accumulates in the circumferential space between teeth. In some instances, solid particulate material carried by prior art tone wheels has abraded or impacted the sensor causing it to fail. The described tone wheel 10 of the invention is self-cleaning and, consequently, reduces the risk of this type of damage to the sensor 51. The teeth 13, in the axial zone sweeping by the sensor, are unsupported radially below themselves and are spaced from the housing 37 of the axle joint 38 supporting the tone wheel. As a consequence of this cantilever support, air can circulate through the slots 14, propelled by centrifugal force, to sweep dust and other contaminants away from the teeth. Additionally, any particulate material finding its way onto the periphery of the tone wheel easily passes through the slots 14 without harmfully abrading or impacting the sensor 51.

Figure 4:
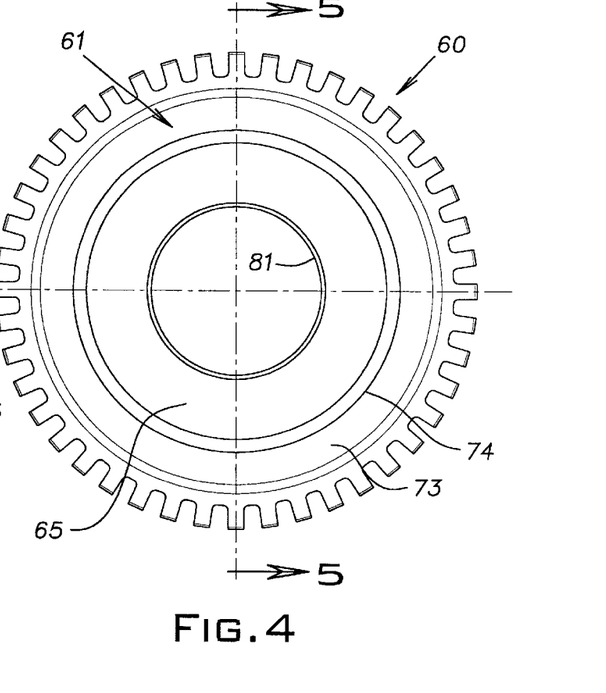
FIG. 4 is a side elevational view of a second embodiment of a tone wheel constructed in accordance with the invention.
Figure 4A:
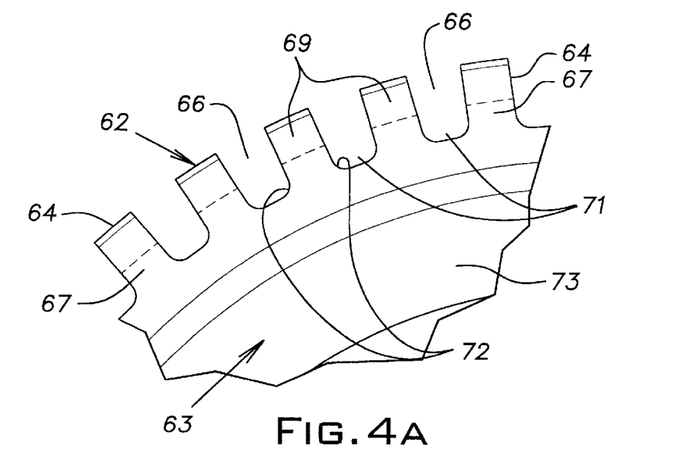
FIG. 4A is an enlarged fragmentary view of a portion of the tone wheel of FIG. 4.
Figure 5:
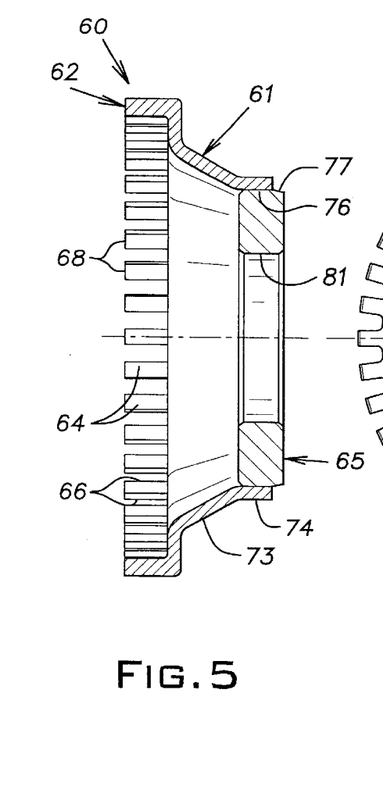
FIG. 5 is a cross-sectional view of the tone wheel taken in the plane indicated at 5—5 in FIG. 4.
Figure 6:
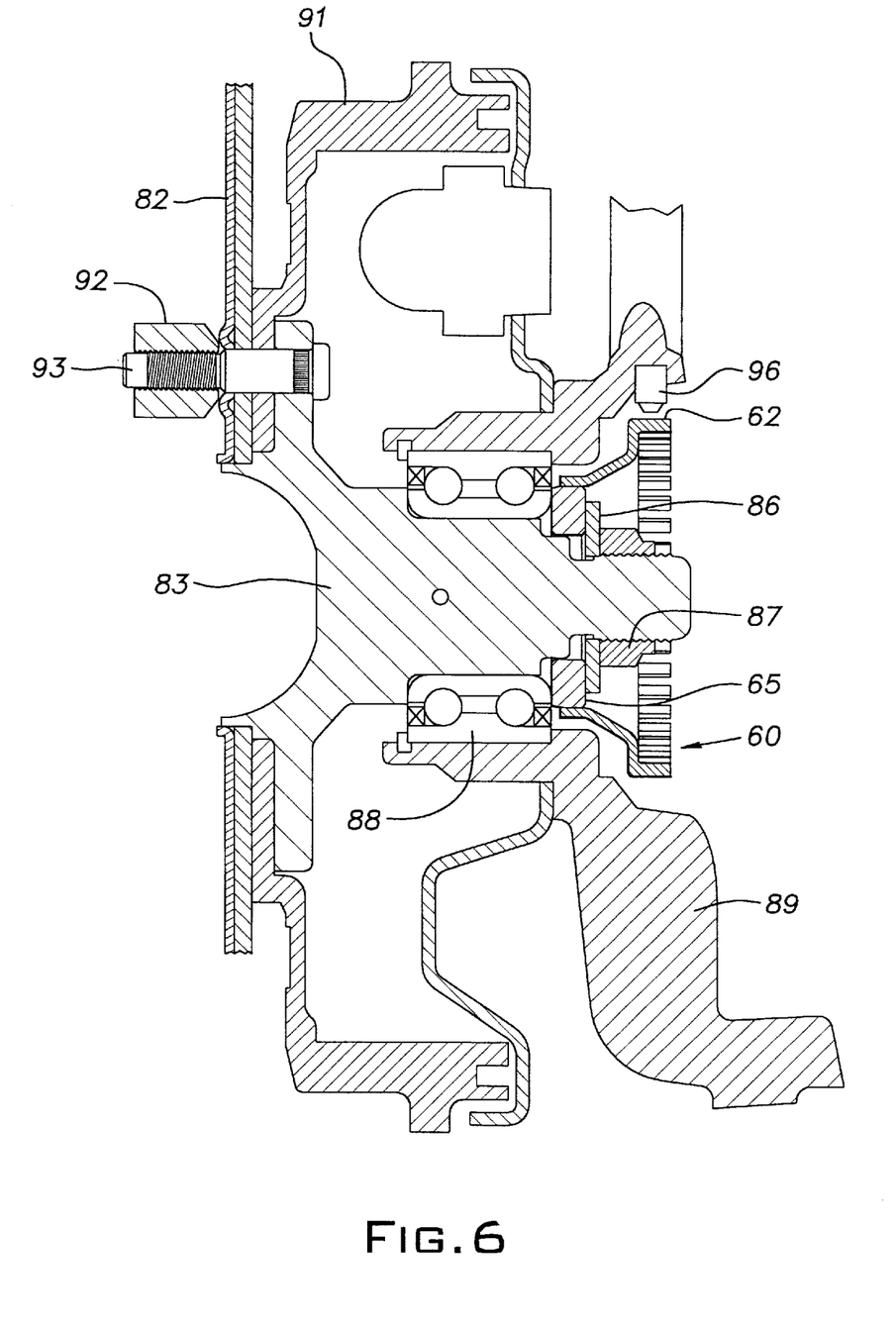
FIG. 6 is a cross-sectional view of a wheel suspension area of a land vehicle and the assembled relationship of the tone wheel of FIGS. 4–5 to this structure.

Referring now to FIGS. 4–6, there is shown another embodiment of a tone wheel 60 constructed in accordance with the invention. The tone wheel 60 comprises two annular coaxial parts 61 and 65. A sheet-steel shell part 61 is similar in construction to the tone wheel 10 described above and is economically formed as a steel stamping. By way of example, but not limitation, the shell 61 can be formed of low carbon steel, 2.69/2.49 mm thick. The shell 61 has a rim or outer peripheral portion 62 and a center portion 63. The outer peripheral portion 62 comprises a multitude of axially extending essentially identical teeth 64 separated by essentially identical slots 66. The illustrated wheel has 44 teeth and an outside diameter of 88 mm. Each tooth 64 has a rectangular cross-section which, in the illustrated case, is square. The teeth 64 are cantilever supported on respective roots 67 formed in an outer peripheral section of the center portion 63. The length of the teeth 64 from a free end 68 to a supported end 69 with a face coplanar with the plane of outer faces of the roots 67.

The roots 67 extend in radial planes and have cross-sections like that of the teeth 64. Gaps 71 between the roots 67 are aligned with the slots 66. Fillets 72 are formed on both circumferential sides of the roots. The radial length of the roots 67 from the inside faces of the teeth 64 is about ⅔ of the radial thickness of a tooth; this length being about 1.8 mm while the radial tooth thickness is nominally 2.6 mm, for example, but not by way of limitation. The center portion 63 includes a conical mid-section 73 and an inner peripheral section 74. The inner peripheral section 74 has an axial bore 76 that is sized to fit on a cylindrical outside diameter surface 77 of the collar 65. The bore 76 has an axial length that is preferably at least about three times the wall thickness of the shell 61 (i.e. about 8 mm) to ensure that it will seat on the collar 64 in a stable rigid manner. The shell 61 is preferably retained on the collar with a press fit. Other retaining techniques such as adhesive bonding, brazing, welding and the like can be used to augment the press fit or to substitute for it.

The collar 65 is preferably formed of a steel with suitable compressive yield strength. As shown, the collar 65 has a cylindrical inside diameter surface or bore 81 concentric with the outside surface 77. FIG. 6 illustrates the tone wheel 60 in assembled relation to a road wheel 82 of a vehicle such as a passenger car, sport utility vehicle, utility van, pick-up truck and the like. The tone wheel 60 is retained and angularly locked on a spindle or hub assembly 83 by a washer 86 and retaining nut 87 threaded onto an inboard end of the spindle 83. The spindle 83 is journaled in a bearing assembly 88 carried in an axle 89 of the vehicle. In the illustrated case, the axle 89 is a rear axle and the spindle 83 is not driven directly by the engine and transmission of the vehicle but, rather, is free-wheeling. The road wheel 82 and a brake drum 91 are retained on the spindle or hub assembly 83 by lug nuts 92 threaded onto studs as is customary.

It will be understood from the foregoing that the tone wheel 60 rotates in synchronization with the road wheel 82. A sensor 96, suitably mounted in the axle 89 closely adjacent the periphery of the tone wheel 60 senses the motion of the teeth 64 to generate electrical pulses at a rate proportional to the speed of the wheel 82. These pulses, as described above, are used with other information to detect wheel skid. The tone wheel 60, like the earlier described tone wheel 10, is open to the atmosphere of the road wheel 82. The open character of the teeth 64, being free of material in a zone between and radially inward of the teeth along the majority of the length of the teeth allows the tone wheel 60 to be self-cleaning or self-purging of dust and debris by centrifugal air flow and by passage of particulate material between adjacent teeth. It should be noted that both disclosed tone wheels 10, 60 have their teeth spaced radially outwardly of any spindle or axle surface so that the possibility of a build-up of dirt and debris on such circumscribed surfaces to the point of fouling the space between the teeth is reduced. Thus, the tone wheels 10, 60 reduce the risk of harm to the sensors 96 by abrasion or impact with material carried on a tone wheel.

In the following descriptions, the phrase "signal wheel" is used to refer to both tone wheels and pulse wheels, both of which are generally known in the art. A tone wheel as discussed above has "teeth", detectable by a sensor, uniformly spaced about its entire periphery while a pulse wheel, typically, has a tooth missing from an otherwise uniformly spaced set of teeth on its periphery. The metal part or parts that form the teeth are typically ferromagnetic to enable a sensor to utilize this property in sensing the presence or absence of successive teeth in near proximity to the sensor as the wheel rotates.

Figure 7:
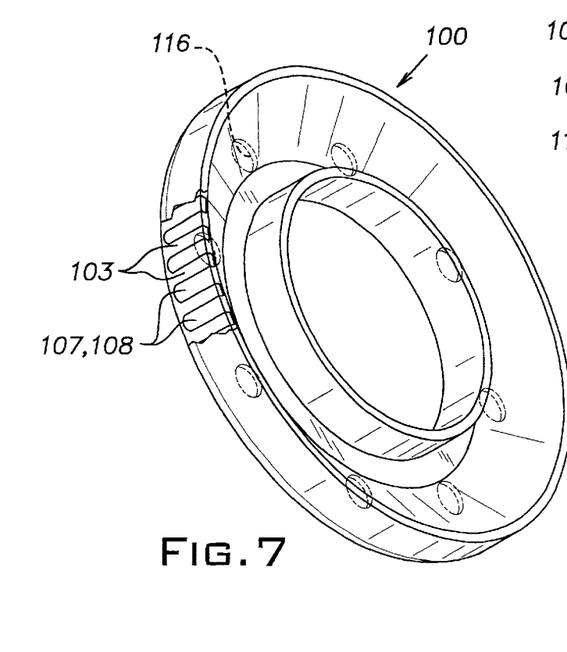
FIG. 7 is a perspective view of a first embodiment of a composite signal wheel constructed in accordance with the invention.
Figure 8:
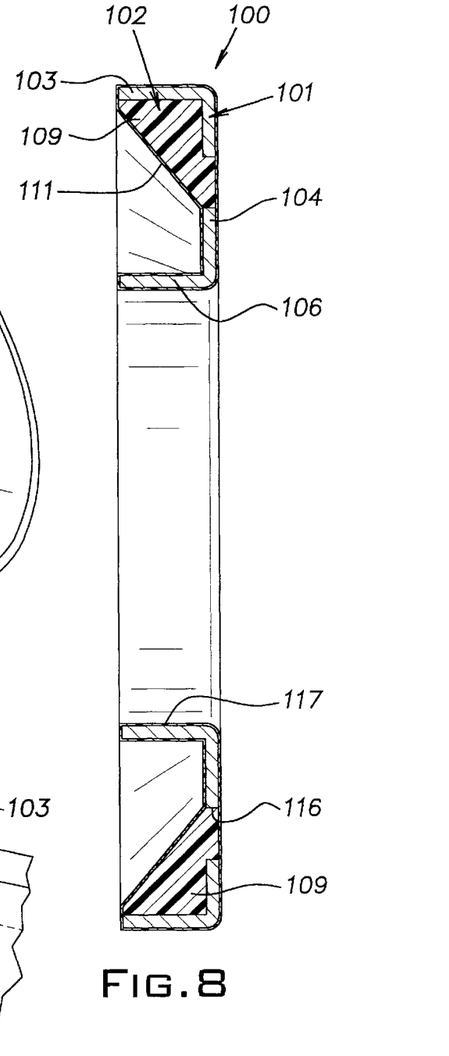
FIG. 8 is a cross-sectional view of the wheel of FIG. 7 taken in a diametral plane parallel to the axis of the wheel.
Figure 9:
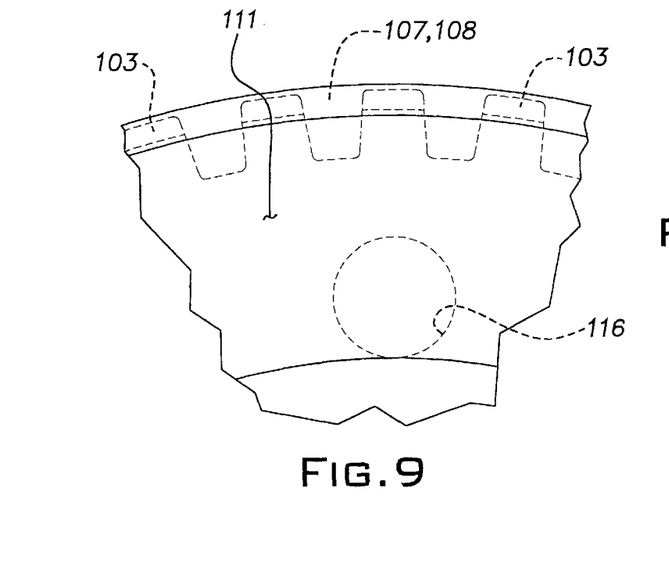
FIG. 9 is an enlarged fragmentary view of a face of the wheel of FIG. 7.

Referring now to FIGS. 7–9, a composite signal wheel 100 includes a circumferentially continuous metal ring or annulus 101 and a circumferentially continuous non-metallic ring or annulus 102. The metal ring 101 can be made of low carbon steel, like that described in earlier embodiments, which is a material that is ferromagnetic. The ring 101 can be manufactured or stamped in the manner described earlier in connection with the embodiments of FIGS. 1–6 and with the same general geometry of the teeth. As such, the metal ring 101 includes a multitude of teeth 103 evenly spaced about its circumference and extending lengthwise parallel to the axis of the ring. The teeth 103, preferably are long in comparison to their width and in comparison to the gaps between teeth. This geometry, as suggested in FIGS. 3 and 6 is useful with a sensor positioned radially outward of the wheel such that the sensor views the cylindrical or nearly cylindrical face of the wheel. The teeth 103 extend integrally from an outer periphery of a web 104. A cylindrical flange 106, integral with the inner periphery of the web 104 is concentric with the circular array of the teeth 103.

The non-metallic ring 102 in this embodiment is made of a material such as nylon molded completely over the metal ring 101 so that it encapsulates the metal ring. The non-metallic ring 102 is, preferably, injection molded with the metal ring 101 first inserted into the mold cavity. The non-metallic ring 102, as well as non-metallic rings described in subsequently disclosed embodiments can be made of any suitable non-metallic material such as thermoplastics, including nylon, or if desired or necessary, suitable thermosetting plastics such as a urethane or epoxy and, additionally, can be made of rubber, cement or ceramic materials. In applications where a wheel is submerged, partially or fully in oil, an oil-resistant rubber such as nitrile butane rubber can be used. Of course, the process used for forming the non-metallic ring will depend on the material selected for constructing it.

As will be understood from inspection of FIGS. 7–9, the non-metallic or plastic material of the ring 102 includes areas 107 in gaps 108 intervening the teeth 103. The ring material completely blocks and fills the spaces or gaps 108 between the teeth 103. The intervening portions 107 of the ring material are interconnected to one another by a circumferentially continuous area 109.

The circumferentially continuous annular area or portion 109 of the non-metallic ring 102 in the illustrated example is provided with a conical surface 111 so that it forms a fillet-like zone in the cross-section of FIG. 8 and does not fill an annular space bounded by the teeth 103, the web 104 and flange 106. Holes 116 through the web 104 at angularly spaced locations are filled with the material of the non-metallic ring 103 so as to mechanically interlock these parts together. Apart from the fillet area 109 and material 107 in the gaps 108, the remainder of the non-metal ring 102 is relatively thin, being in the form of a coating of, for example, about 0.05 inch thick in its covering of the metal ring 101. If desired, the inner surface or bore, designated 117, of the flange 106 can be left uncoated by the material of the non-metallic ring 102.

The non-metallic ring 102 blocks the gaps 108 such that debris cannot become lodged between the teeth 103 of the metal ring so that the risk of damage to the sensor monitoring the rotation of the wheel 100 or the wheel itself is reduced. The non-metallic ring 102 provides a relatively smooth surface on the interior and exterior of the wheel 100 so that where it or like wheels are immersed in engine oil, for example, churning and aeration of the oil is reduced. The non-metallic ring 102 can reinforce the metal ring 101 enabling the use of lighter gauge material in the metal ring. To this end, the material forming the non-metallic ring 102 can be a composite with suitable reinforcement fillers or fibers.

The following disclosure illustrates other forms of the invention in which non-metallic rings have different shapes, assembly techniques and varied functions. Common to all of these versions is the ability of the non-metallic ring to block debris or fluid from the gap between the teeth and smoothing of the periphery of the wheel from that of a bare metal ring with peripheral teeth.

Figure 10:
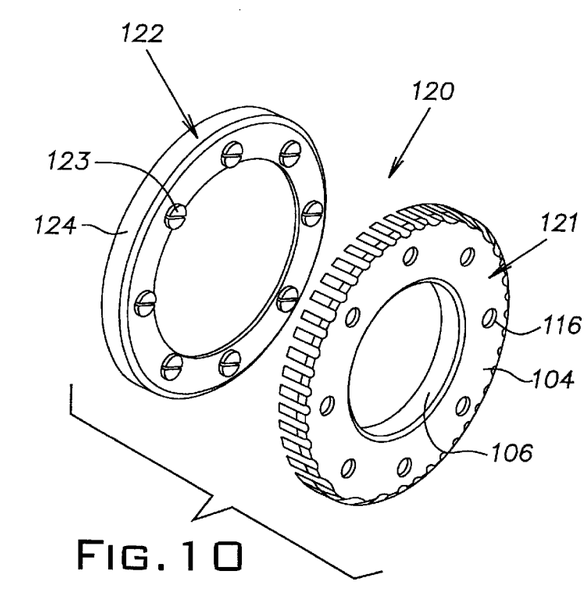
FIG. 10 is an exploded perspective view of a second embodiment of a composite signal wheel constructed in accordance with the invention.
Figure 11:
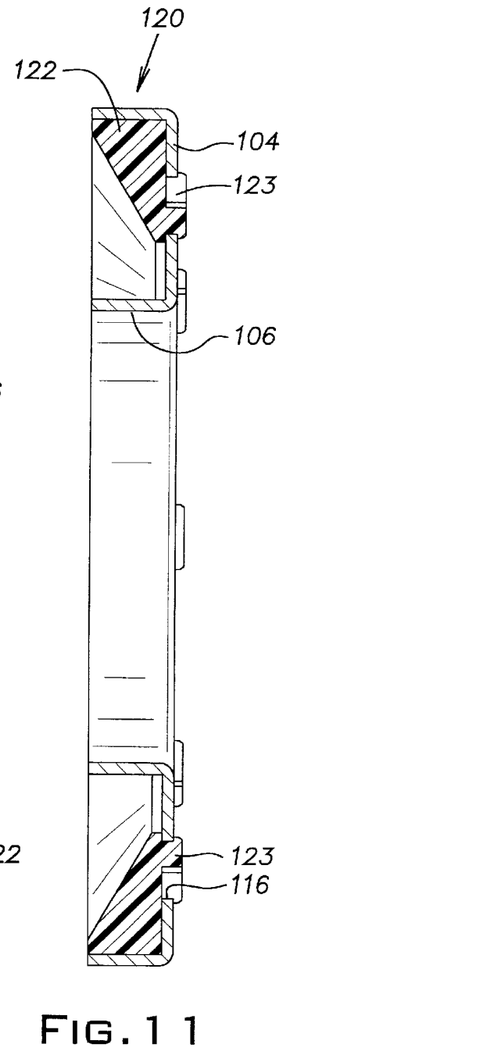
FIG. 11 is a cross-sectional view of the signal wheel of FIG. 10 taken in a diametral plane parallel to the axis of the wheel.
Figure 12:
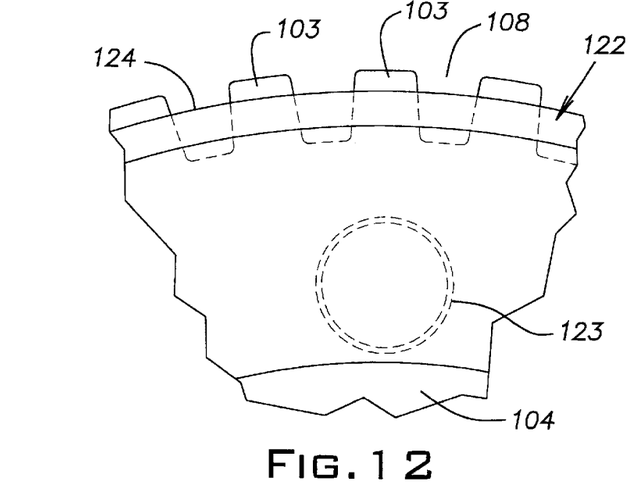
FIG. 12 is an enlarged fragmentary view of a face of the wheel of FIG. 10.

Referring now to FIGS. 10–12, a composite signal wheel 120 comprises a ferromagnetic metal ring 121 and a non-metallic ring 122. The metal ring 121 is similar to that described in connection with FIGS. 7–10 and the same numerals are used to indicate like parts. The non-metal ring 102, typically injection-molded of suitable plastic such as nylon, is joined to the metal ring 121 by pressing it into place and causing resilient split pins 123 to push through aligned holes 116 in the web 104 of the metal ring 121 and be retained in these holes with a snap fit. An outer surface 124 of the non-metallic ring 122 abuts the inside surfaces of the teeth 103 so as to block passage of debris or oil through gaps 108 between the teeth. As shown, the non-metal ring 122 can have a fillet-like geometry similar to that of FIGS. 7–9.

Figure 13:
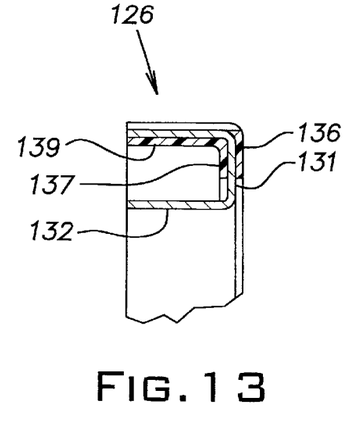
FIG. 13 is a fragmentary cross-sectional view of a composite signal wheel taken in a plane parallel to the axis of the wheel in accordance with the third embodiment of a composite signal wheel.
Figure 14:
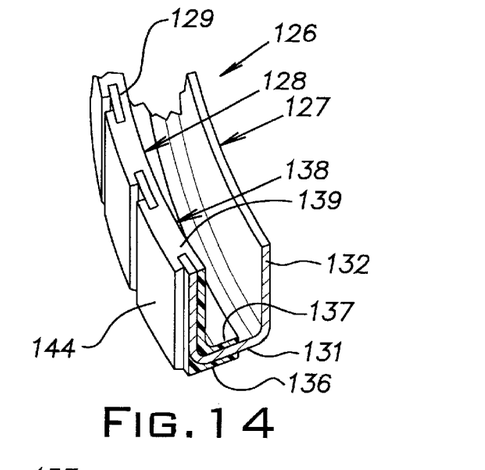
FIG. 14 is a fragmentary perspective view of the wheel of FIG. 13.

FIGS. 13 and 14 illustrate a composite signal wheel 126 comprising a ferromagnetic metal ring or part 127 and a non-magnetic or non-metal ring 128. The metal ring 127 is annular or round in form with teeth 129 extending axially from an outer periphery of a generally radial annular web 131. A cylindrical flange 132 with a mounting bore 133 extends axially from an inner periphery of the web 131. The non-metal ring or part 128 is molded as a unitary component on portions of the teeth 129 and web 131 in a manner that mechanically interlocks the non-metal ring 128 to the metal ring 127. The non-metal ring 128 includes radially extending walls 136, 137 gripping opposite sides of a peripherally outer portion of the web 131. An axially extending portion 138 of the non-metal ring 128 has a circumferentially continuous flange 139 on the inside faces of the teeth 129 and T-shaped elements 141 filling gaps between the teeth 129 and overlying edge areas of radially outer faces of the teeth.

Figure 15:
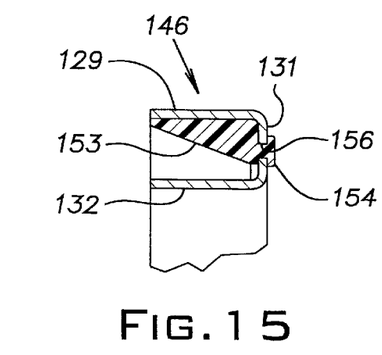
FIG. 15 is a fragmentary cross-sectional view of a composite signal wheel taken in a plane parallel to the axis of the wheel in accordance with yet another embodiment of the invention.
Figure 16:
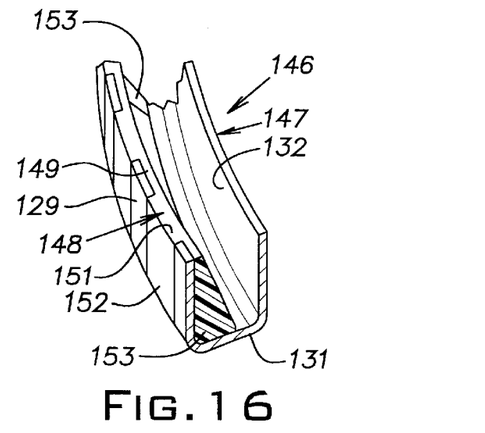
FIG. 16 is a fragmentary perspective view of the wheel of FIG. 9.

The embodiment of FIGS. 15 and 16 is a signal wheel 146 with a ferromagnetic metal ring part 147 and a non-metal ring part 148. The metal ring 147 is like that described in connection with FIGS. 13 and 14 so that the same numerals are used to designate the teeth 129, web 131 and inner flange 132. The non-metal ring 147 is molded or otherwise formed with a circumferentially continuous cylindrical band 149 that abuts the inner surface of the teeth 129. The band 149 has integral ribs 151 that fill gaps between the teeth 129 and have outer faces 152 flush with outer faces of the teeth 129, i.e. at the same radius. The teeth 129 and ribs 151 cooperate to produce a substantially smooth outer periphery of the signal wheel 146. The non-metal ring 148 includes circumferentially or angularly spaced gussets that abut the web 131. Integral retention bosses 154 associated with the gussets 153 are retained in aligned holes 156 in the web 131. The bosses 154 can be molded in the holes 156 when the non-metal part 148 is molded on the metal part 147 or can be snapped into the holes 156 or flattened in the manner of rivets where the non-metal ring part is preformed and subsequently assembled on the metal ring part.

Figure 17:
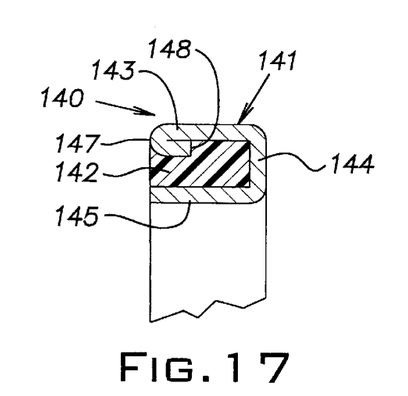
FIG. 17 is a fragmentary cross-sectional view of a composite signal wheel taken in a plane parallel to the axis of the wheel in accordance with a further embodiment of the invention.
Figure 18:
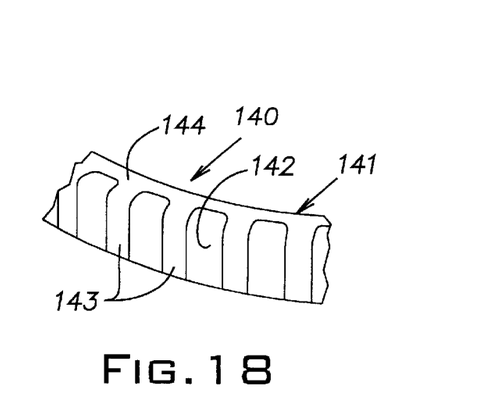
FIG. 18 is a fragmentary perspective view of the wheel of FIG. 17.

FIGS. 17 and 18 illustrate another embodiment of a signal wheel 140 that includes a ferromagnetic annular metal part or ring 141 and a non-metallic annular part or ring 142. The metal ring 141 is similar to other rings described hereinabove, being formed of sheet metal and having integral axially extending teeth 143, a radial web 144 and a cylindrical flange 145. Cantilevered ends 147 of the teeth 143 remote from the web 144 are bent in on themselves so that they form with their original end face a radial abutment surface 148. The non-metal ring 142 is molded or otherwise situated in the annular space bounded by the teeth 143, web 144 and flange 145. As shown in FIG. 18, the material of the non-metal ring 142 fills the gaps between the teeth 145 to provide a substantially smooth outer periphery on the signal wheel 140. The abutment surfaces 148 of the unturned ends of the teeth 143 lock the non-metallic ring 142 in place. The length of the inturned part of the teeth 143 can be increased to lie adjacent the web 144, if desired, to increase the mass of each of the teeth for an improved signal while enabling the use of relatively thin sheet stock.

Figure 19:
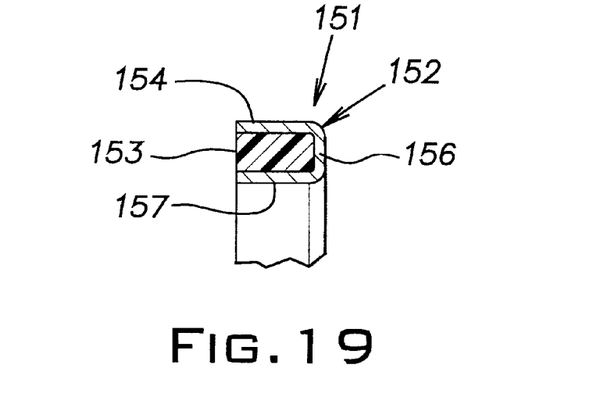
FIG. 19 is a fragmentary cross-sectional view of a composite signal wheel taken in a plane parallel to the axis of the wheel in accordance with another embodiment.
Figure 20:
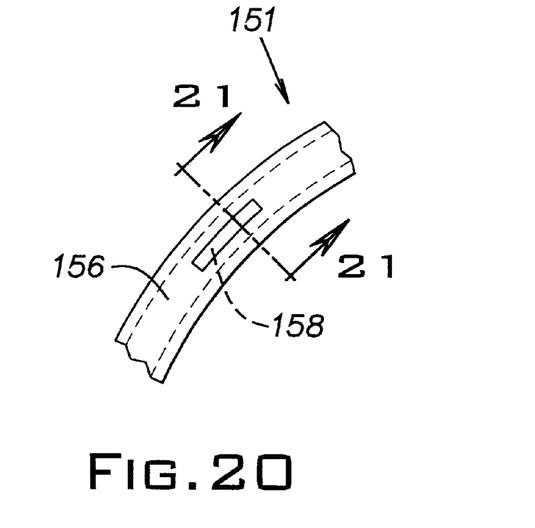
FIG. 20 is a fragmentary end view of the wheel, as seen from the right in FIG. 19.
Figure 21:
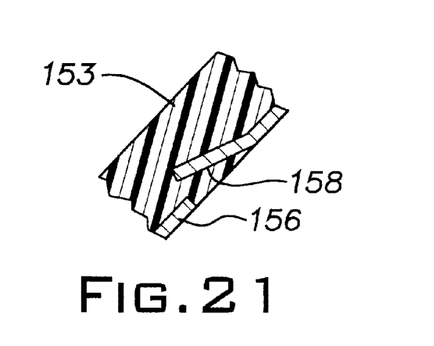
FIG. 21 is a fragmentary cross-sectional view of the wheel taken in a plane indicated by the lines 21—21 in FIG. 20.

Referring now to FIGS. 19–21, another embodiment of a signal wheel of the invention is shown. The signal wheel 151, like earlier described assemblies, includes a ferromagnetic metal annular ring 152 and a non-metal annular ring 153. The metal ring 152 has circumferentially spaced peripheral teeth 154 like those of earlier embodiments such as shown, for example, in FIGS. 13 and 14 extending integrally and axially from an outer periphery of a generally radial web 156 of the metal ring 152. A cylindrical flange 157 extends from an inner periphery of the web 156. A plurality of tabs 158, spaced about the periphery of the web 156 are lanced or cut out of the web and bent into an annular space bounded by the teeth 154, web and flange 157. The non-metallic ring 152 is molded, cast, or otherwise disposed in this annular area. The tabs 158 retain the non-metallic ring 153 in the metal ring 152. Gaps between the teeth 154 can be filled by the material of the non-metal ring 153 so as to present a relatively smooth peripheral surface of the wheel 151 at its outer periphery.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. For example, where the application dictates, the elongated teeth, while generally axially oriented, can have their longitudinal axes forming a limited angle of, for example, up to about 20°, with the rotational axis of the wheel. Composite signal wheels can have various geometries including ferromagnetic rings or wheels such as shown in FIGS. 1–6. Accordingly, the patent is not to be limited in scope and effect to the specific embodiments herein shown and described nor in any other way that is inconsistent with the extent to which the progress in the art has been advanced by the invention.

What is claimed is:

1. A tone wheel for signaling the rotational speed of a wheel in a land vehicle comprising a unitary body formed of sheet steel, the body including a center portion and a rim portion radially outward of the center portion and concentric about a central axis, the rim portion having a multitude of elongated substantially identical generally axially oriented teeth, each tooth being separated from adjacent teeth by slots of substantially identical width, each tooth having a generally rectangular cross-section in a plane perpendicular to its longitudinal axis, the width of a tooth being substantially less than the length of a tooth and the width of a slot being similar to the width of a tooth, the center portion having a periphery formed by generally radially extending roots each supporting a respective one of said teeth, said roots being arcuately spaced from one another by gaps that merge with associated ones of said slots.

2. A tone wheel as set forth in claim 1, wherein said roots each have a cross-section in a plane perpendicular to a line radial to the axis that is substantially the same as the cross-section of a tooth.

3. A tone wheel as set forth in claim 1, wherein the spaces between said teeth are blocked by a non-magnetic material.

4. A tone wheel as set forth in claim 3, wherein said non-magnetic material is a circumferentially continuous body radially within an annular zone occupied by said teeth.

5. A tone wheel as set forth in claim 4, wherein said non-magnetic material occupies substantially the full space between said teeth in said annular zone.

6. An assembly for a land vehicle comprising a wheel suspension structure including a spindle for supporting a road wheel, a tone wheel having a central axis and being mechanically coupled to the spindle in a manner such that it rotates coaxially with the spindle, the tone wheel being adjacent the spindle and being in a zone open to the environment of the road wheel, the tone wheel having a unitary body formed of sheet steel, the body including a center portion and a rim portion radially outward of the center portion, the rim portion having a multitude of elongated substantially identical axially oriented teeth, each tooth being separated from adjacent teeth by slots of substantially identical width, each tooth having a generally rectangular cross-section in a plane perpendicular to the central axis, the width of a tooth being substantially less than the length of the tooth and the width of a slot being similar to the width of a tooth, the center portion having a periphery formed by generally radially extending roots each supporting a respective one of said teeth, said roots being arcuately spaced from one another by gaps that merge with associated ones of said slots, said center portion supporting each of said teeth at one end through said roots while an opposite end of each of said teeth is free of direct support in the manner of a cantilever, a sensor carried on said structure in close proximity to the periphery of the tone wheel and generally centered on the axial length of the teeth and adapted to produce a signal indicating the rotational speed of the tone wheel and, therefore, the road wheel, the open character of the slots enabling the tone wheel to be self-cleaning of dust and debris both through radially outward passage of air and radially inward passage of solids through the slots so that the risk that the sensor will be abraded or struck by foreign material carried on the wheel is reduced.

7. An assembly as set forth in claim 6, wherein said center portion has a hub with a cylindrical flange.

8. An assembly as set forth in claim 7, wherein said flange is press fit over a cylindrical surface.

9. A composite signal wheel comprising a circular magnetic metal member having a multitude of teeth extending in an axial direction adjacent a periphery of the wheel, the teeth each being identical to one another, each tooth having a length, width and thickness, the length of each tooth being greater than both its width and its thickness, each tooth extending lengthwise in a direction parallel to an axis of the wheel and having a circumferential spacing from adjacent teeth, the circumferential spacing between the teeth being substantially uniform, the space between the teeth being blocked by non-magnetic material extending fully between the teeth and circumferentially continuously radially inwardly of the teeth whereby the volume of debris of material that can be supported between the teeth is reduced from that which could be supported in the absence of such non-magnetic material, and the teeth are directly radially supported by said non-magnetic material that radially underlies the teeth.

10. A signal wheel as set forth in claim 9, wherein said non-magnetic material is disposed in the space between said teeth.

11. A signal wheel as set forth in claim 10, wherein said non-magnetic material covers substantially all of said teeth.

12. A signal wheel as set forth in claim 11, wherein said non-magnetic material is molded around said teeth.

13. A signal wheel as set forth in claim 10, wherein said non-magnetic material is molded as a separate unit and assembled with said teeth after molding.

14. A signal wheel as set forth in claim 10, wherein said non-magnetic material fills the space between teeth and physically supports said teeth.

15. A composite signal wheel as set forth in claim 9, wherein said circular magnetic member includes a radial web radially inward from said teeth and a generally cylindrical flange extending axially from said web concentrically within a circular zone defined by said teeth, said non-magnetic material extending radially between and being in contact with said teeth and said flange such that radial forces on said teeth can be transferred by said non-magnetic material to said flange and thereby be supported by said flange.

16. A composite signal wheel comprising a circumferentially continuous ring of ferromagnetic sheet steel material forming a multitude of circumferentially uniformly spaced teeth, the teeth defining gaps therebetween adjacent a periphery of the wheel, the teeth extending along an axis of the wheel a distance at least as large as the gaps whereby the teeth can be scanned by a sensor disposed radially outward of the teeth, and an integral body of non-magnetic material substantially filling the gaps between the teeth and forming a circumferentially continuous annulus radially within the teeth, parts of said annulus radially underlying said teeth being arranged to support said teeth.

17. A composite signal wheel as set forth in claim 16, wherein said sheet metal ring includes a radial web radially inward from said teeth and a generally cylindrical flange extending axially from said web concentrically within a circular zone defined by said teeth, said non-magnetic material extending radially between and being in contact with said teeth and said flange such that radial forces on said teeth can be transferred by said non-magnetic material to said flange and thereby be supported by said flange.

* * * * *